US010440384B2

United States Patent
Agyo et al.

(10) Patent No.: US 10,440,384 B2
(45) Date of Patent: Oct. 8, 2019

(54) ENCODING METHOD AND EQUIPMENT FOR IMPLEMENTING THE METHOD

(71) Applicant: ATEME, Velizy Villacoublay (FR)

(72) Inventors: Zineb Agyo, Boulogne Billancourt (FR); Mathieu Monnier, Paris (FR); Jean-Marc Thiesse, Saint Cloud (FR); Pierre Larbier, Bievres (FR)

(73) Assignee: ATEME, Velizy Villacoublay (FR)

(*) Notice: Subject to any disclaimer, the term of this patent is extended or adjusted under 35 U.S.C. 154(b) by 119 days.

(21) Appl. No.: 15/529,031

(22) PCT Filed: Nov. 20, 2015

(86) PCT No.: PCT/FR2015/053148
§ 371 (c)(1),
(2) Date: May 23, 2017

(87) PCT Pub. No.: WO2016/083709
PCT Pub. Date: Jun. 2, 2016

(65) Prior Publication Data
US 2017/0264914 A1 Sep. 14, 2017

(30) Foreign Application Priority Data
Nov. 24, 2014 (FR) ...................................... 14 61367

(51) Int. Cl.
H04N 19/139 (2014.01)
H04N 19/52 (2014.01)
(Continued)

(52) U.S. Cl.
CPC ........... *H04N 19/52* (2014.11); *H04N 19/109* (2014.11); *H04N 19/11* (2014.11); *H04N 19/139* (2014.11);
(Continued)

(58) Field of Classification Search
CPC .................... H04N 19/52; H04N 19/109
See application file for complete search history.

(56) References Cited

U.S. PATENT DOCUMENTS 6,317,460 B1 * 11/2001 Lee .................. H04N 19/105
348/699
8,254,456 B2 * 8/2012 Lee .................. H04N 19/197
375/240.16
(Continued)

FOREIGN PATENT DOCUMENTS

EP 1 806 931 A2 7/2007

OTHER PUBLICATIONS

Qi, J., et al., "Efficient Rate-Distortion Optimization for HEVC Using SSIM and Motion Homogeneity," Picture Coding Symposium, Dec. 2013, pp. 217-220.
(Continued)

*Primary Examiner* — Jayanti K Patel
*Assistant Examiner* — Irfan Habib
(74) *Attorney, Agent, or Firm* — Young & Thompson

(57) ABSTRACT

Disclosed is a method for encoding a first image in a set of images, in which the first image is cut into blocks, each block being encoded according to one from a plurality of encoding modes including at least one temporal correlation prediction encoding mode using a plurality of images from the set of images. The method includes, for a current block of the first image: determining a first motion estimation vector of the current block, determining a value of a visual distortion metric for a temporal correlation prediction encoding mode, the visual distortion metric using a distance between a first temporal prediction vector of the current block pointing to the second image and the first motion estimation vector of the current block, and using the value of the visual distortion metric to encode the current block.

18 Claims, 6 Drawing Sheets

(51) Int. Cl.
*H04N 19/147* (2014.01)
*H04N 19/11* (2014.01)
*H04N 19/109* (2014.01)
*H04N 19/19* (2014.01)
*H04N 19/573* (2014.01)
*H04N 19/154* (2014.01)
*H04N 19/176* (2014.01)

(52) U.S. Cl.
CPC ......... *H04N 19/147* (2014.11); *H04N 19/154* (2014.11); *H04N 19/176* (2014.11); *H04N 19/19* (2014.11); *H04N 19/573* (2014.11)

(56) References Cited

U.S. PATENT DOCUMENTS

| | | | | |
|---|---|---|---|---|
| 8,913,660 B2* | 12/2014 | Tourapis | H04N 19/56 | 375/240.12 |
| 8,917,769 B2* | 12/2014 | Xu | H04N 19/61 | 375/240.16 |
| 9,414,092 B2* | 8/2016 | Su | H03M 7/4031 | |
| 9,491,461 B2* | 11/2016 | Chen | H04N 19/52 | |
| 9,503,743 B2* | 11/2016 | Guo | H04N 19/105 | |
| 9,569,688 B2* | 2/2017 | Lee | G06K 9/4638 | |
| 9,654,792 B2* | 5/2017 | Chiu | H04N 19/56 | |
| 9,794,583 B2* | 10/2017 | Terada | H04N 19/70 | |
| 10,097,855 B2* | 10/2018 | Kondo | H04N 19/105 | |
| 10,104,391 B2* | 10/2018 | Su | H04N 19/52 | |
| 2003/0072374 A1* | 4/2003 | Sohm | H04N 19/56 | 375/240.16 |
| 2005/0025244 A1* | 2/2005 | Lee | H04N 5/145 | 375/240.16 |
| 2005/0025249 A1 | 2/2005 | Zhao et al. | | |
| 2005/0286636 A1* | 12/2005 | Nicolas | H04N 5/145 | 375/240.16 |
| 2006/0072664 A1* | 4/2006 | Kwon | G09G 3/20 | 375/240.16 |
| 2006/0093228 A1* | 5/2006 | Loukianov | H04N 7/012 | 382/236 |
| 2008/0159401 A1* | 7/2008 | Lee | H04N 19/52 | 375/240.16 |
| 2008/0253457 A1* | 10/2008 | Moore | H04N 19/52 | 375/240.16 |
| 2009/0034854 A1* | 2/2009 | Lee | H04N 19/105 | 382/236 |
| 2009/0252229 A1* | 10/2009 | Cieplinski | H04N 19/139 | 375/240.16 |
| 2010/0091862 A1* | 4/2010 | Kuo | H04N 19/56 | 375/240.16 |
| 2010/0208820 A1* | 8/2010 | Huang | H04N 19/56 | 375/240.16 |
| 2010/0266043 A1* | 10/2010 | Huang | H04N 19/56 | 375/240.16 |
| 2010/0290530 A1* | 11/2010 | Huang | H04N 19/139 | 375/240.16 |
| 2011/0002387 A1* | 1/2011 | Chiu | H04N 19/61 | 375/240.15 |
| 2011/0102681 A1* | 5/2011 | Lee | H04N 7/0122 | 348/699 |
| 2011/0103473 A1* | 5/2011 | Li | H04N 19/176 | 375/240.12 |
| 2011/0150095 A1* | 6/2011 | Choi | H04N 19/52 | 375/240.16 |
| 2011/0170602 A1* | 7/2011 | Lee | H04N 19/44 | 375/240.16 |
| 2012/0008688 A1* | 1/2012 | Tsai | H04N 19/52 | 375/240.16 |
| 2013/0058413 A1* | 3/2013 | Guo | H04N 19/105 | 375/240.15 |
| 2013/0107958 A1* | 5/2013 | Shimada | H04N 19/52 | 375/240.15 |
| 2013/0114722 A1* | 5/2013 | Koyama | H04N 19/52 | 375/240.16 |
| 2013/0136181 A1* | 5/2013 | Amitay | H04N 19/433 | 375/240.16 |
| 2013/0182971 A1* | 7/2013 | Leontaris | G06T 5/002 | 382/275 |
| 2014/0092959 A1* | 4/2014 | Onno | H04N 19/176 | 375/240.03 |
| 2014/0205013 A1* | 7/2014 | Kim | H04N 19/56 | 375/240.16 |
| 2014/0307788 A1 | 10/2014 | Lim et al. | | |
| 2015/0078451 A1* | 3/2015 | Tourapis | H04N 19/56 | 375/240.16 |
| 2016/0219302 A1* | 7/2016 | Liu | H04N 19/583 | |
| 2017/0332095 A1* | 11/2017 | Zou | H04N 19/124 | |
| 2017/0332097 A1* | 11/2017 | Lee | H04N 19/52 | |

OTHER PUBLICATIONS

Guillaume, L., et al., "RD Optimized Coding for Motion Vector Predictor Selection," IEEE Transaction on Circuits and Systems for Video Technology, vol. 17, No. 12, Dec. 2008, pp. 1681-1691.

Yeo, C., et al., "On Rate Distortion Optimization Using SSIM," IEEE International Conference on Acoustics, Mar. 2012, pp. 833-836.

Sullivan, G., et al., "Overview of the High Efficiency Video Coding (HEVC) Standard," IEEE Transactions on Circuits and Systems for Video Technology, Jan. 2012, pp. 1-19.

Ashwin, S., et al., "Study of the Contemporary Motion Estimation Techniques for Video Coding," International Journal of Recent Technology and Engineering (IJRTE), vol. 2, Issue 1, Mar. 2013, pp. 190-194.

Mo, Y., et al., "Quantization Matrix Coding for High Efficiency Video Coding," Advances on Digital Television and Wireless Multimedia Communications, Communication in Computer and Information Science, vol. 331, 2012, pp. 244-249.

Watson, A., et al., "Digital Video Quality Metric Based on Human Vision," Journal of Electronic Imaging, vol. 10, No. 1, Jan. 2001, pp. 20-29.

Sullivan, G., et al., "Overview of the High Efficiency Video Coding (HEVC) Standard," IEEE T-CSVT, Dec. 2012, pp. 1649-1668.

Lubin, J., "Sarnoff JND Vision Model," T1A1.5 Working Group Document, T1 Standards Committee, Jul. 1997, pp. 1-33.

Wang, Z., et al., Video Quality Assessment Based on Structural Distortion Measurement, IEEE Signal Proc. Image Communication, vol. 19, No. 2, Feb. 2004, pp. 121-132.

Bhat, A., et al., "A New Perceptual Quality Metric for Compressed Video," IEEE, 2009, pp. 933-936.

Zeng, K., et al., "Characterizing Perceptual Artifacts in Compressed Video Streams," Human Vision and Electronic Imaging XIX, Proc. SPIE, vol. 9014, Feb. 2014, pp. 1-10.

* cited by examiner

ENCODING METHOD AND EQUIPMENT FOR IMPLEMENTING THE METHOD

The present invention relates to an image encoding method and a device for implementing this method. It applies in particular to the encoding of images from a video stream.

BACKGROUND OF THE INVENTION

Video data are generally the subject of source coding aimed at compressing them in order to limit the resources necessary for their transmission and/or storage. Numerous coding standards exist, such as H.264/AVC, H.265/HEVC and MPEG-2, which can be used for this purpose.

A video stream comprising a set of images is considered. In conventional coding schemes, the video stream images to be encoded are typically considered according to an encoding sequence, and each one is divided into sets of pixels, themselves also processed sequentially, for example beginning at the top left and finishing at the bottom right of each image.

Encoding an image from the stream is thus carried out by dividing a matrix of pixels corresponding to the image into several sets, for example blocks of fixed size 16×16, 32×32 or 64×64, and by coding these blocks of pixels according to a given processing sequence. Certain standards, such as H.264/AVC, provide for the possibility of breaking down blocks of size 16×16 (then called macro-blocks) into sub-blocks, for example of size 8×8 or 4×4, in order to carry out the encoding processing with finer granularity.

Existing video compression techniques can be divided into two broad categories: on the one hand the compression known as "Intra" compression, in which the compression processing is carried out on the pixels of a single image or video frame, and on the other hand the compression known as "Inter" compression, in which the compression processing is carried out on several video images or frames. In Intra mode, the processing of a block (or set) of pixels typically comprises a prediction of the pixels of the block carried out using (previously coded) causal pixels present in the image currently being encoded (called "current image"), in which case the term "Intra prediction" is used. In the Inter mode, the processing of a block (or set) of pixels typically comprises a prediction of the pixels of the block carried out using pixels originating from previously encoded images, in which case the term "Inter prediction" or "motion compensation" is used.

These two types of coding are used in the existing video codecs (MPEG2, H.264/AVC, HEVC) and are described for the HEVC codec in the article entitled "Overview of the High Efficiency Video Coding (HEVC) Standard", by Gary J. Sullivan et al., IEEE Transactions on Circuits and Systems for Video Technology, vol. 22, No. 12, December 2012.

This exploiting of the spatial and/or temporal redundancies makes it possible to avoid transmitting or storing the value of the pixels of each block (or set) of pixels, by representing at least some of the blocks with a residual of pixels representing the difference (or the distance) between the prediction values of the pixels of the block and the actual values of the pixels of the predicted block. The information from the residuals of pixels is present in the data generated by the encoder after transform (for example of the DCT type) and quantification in order to reduce the entropy of the data generated by the encoder.

It is desirable to reduce as far as possible the additional information generated by the prediction of the pixels and present in the encoder output in order to increase the efficiency of a coding/compression scheme at a given distortion level. Conversely, it may also be sought to reduce this additional information in order to increase the efficiency of a coding/compression scheme at a given encoder output rate.

A video encoder typically makes a choice of coding mode corresponding to a selection of the encoding parameters for a processed set of pixels. The taking of this decision can be implemented by optimizing a rate and distortion metric, the encoding parameters selected by the encoder being those that minimize a rate-distortion criterion. The choice of coding mode then has an impact on the performance of the encoder, both in terms of rate gain and visual quality.

In fact, choosing the wrong coding mode can result in artefacts which lead to a degradation of the perceived visual quality. Methods of calculation based on the rate-distortion optimization make it possible to reduce the encoder output rate; nevertheless sometimes at the expense of the visual rendering.

The distortion is in fact calculated using so-called "objective" metrics, such as the sum of absolute differences (SAD), or the mean square error (MSE), which prove to be very weakly correlated with the perceptual quality. In fact, certain video compression methods can improve the visual quality while they degrade the objective metrics.

Distortion metrics based on visual perception have been proposed as alternatives to the objective mathematical measurements. These metrics use a modelling of the known psycho-visual properties of the human visual system, and are called HVS (Human Visual System) metrics. The following may be mentioned as examples of HVS metrics: the JND (Just Noticeable Difference) metric described in the article "Sarnoff JND vision model", J. Lubin et al., T1A1.5 Working Group Document, T1 Standards Committee, 1997, the DVQ (Digital Video Quality) metric described in the article "Digital video quality metric based on human vision", Journal of electronic imaging, vol. 10, no. 1, January 2001, pp. 20-29, or also the VSSIM (Video Structural Similarity Index) metric described in the article "Video Quality Assessment Based on Structural Distortion Measurement", Z. Wang et al., IEEE Signal Proc. Image Communication, vol. 19, no. 2, February 2004, pp. 121-132.

These methods for measuring the visual distortion (also called "subjective distortion") have the drawback of being very complex, and cannot be envisaged in practice in an encoder. For example, they require too much computing power to be implemented in a real-time video encoder. They are useful only for the purpose of encoding in order to estimate a posteriori the visual quality of an encoded/compressed video by using objective metrics.

Another subjective distortion metric, i.e. based on visual perception, was proposed by A. Bhat et al. in the article "A new perceptual quality metric for compressed video", with the ambition of integrating the use of the proposed perceptual quality metric into an algorithm for choosing the coding mode of a video codec of the H.264/AVC type. The metric proposed in the article is calculated as follows:

$$MOSp_{block} = 1 - k_{block}(MSE_{block}) \qquad (1)$$

where $MOSp_{block}$ is the perceptual quality of the processed block, $k_{block}$ a constant calculated as a function of the presence of details in the block, and $MSE_{block}$ the mean square error. This metric is based on the principle that the artefacts will have a tendency to be more visible in the zones without details, and is thus based solely on the local characteristics of the processed block.

A need therefore exists for an image encoding method that is improved by taking into account the motion in a set of images or a video stream to be encoded.

SUMMARY OF THE INVENTION

An object of the present invention is to propose an image encoding method that is improved by taking the motion into account.

Another object of the present invention is to propose an image encoding method by means of blocks making it possible to take the motion into account irrespective of the nature of the processed block.

According to a first aspect, a method is proposed for encoding a first image in a set of images, in which the first image is split into blocks, each block being encoded according to one among a plurality of coding modes comprising at least one coding mode of the temporal correlation prediction type using a plurality of images from the set of images, the method comprising, for a current block of the first image: determining a first motion estimation vector of the current block, the first motion estimation vector pointing to a block correlated with the current block in a second image from the set of images distinct from the first image and previously coded according to a predefined sequence of encoding the images from the set of images; determining a value of a visual distortion metric for a coding mode of the temporal correlation prediction type, the visual distortion metric using a distance between a first temporal prediction vector of the current block pointing to the second image and the first motion estimation vector of the current block; and using the value of the visual distortion metric for encoding the current block.

The proposed method makes it possible to take into account the motion in a set of images to be encoded, irrespective of the nature of the block. In particular, the proposed method makes it possible to take into account the motion without being limited to the local characteristics of the processed block. The visual quality of the coding mode considered is quantified in the form of a distortion, which makes it possible to improve the choices of the encoder for all the modes and also to avoid unwanted Skip problems.

Moreover, the proposed method has the advantage of proposing a determination of visual distortion which does not significantly impact the complexity of the calculations carried out by the encoder. Thus, the proposed method has the advantage of not being very complex to implement, having a very low calculation complexity and rapid speed of execution which in particular allows it to be integrated into a real-time encoding solution without significant impact. It thus makes it possible in particular to improve the overall quality of the coding within an image belonging to a video sequence.

The proposed method is particularly, although not exclusively, suitable for encoding or compressing an image from a sequence of images according to a scheme of the H.261, MPEG-1 Part 2, H.262, MPEG-2 Part 2, H.264, AVC, MPEG-4 Part 2, H. 265, HEVC (High Efficiency Video Coding) or SHVC (Scalable HEVC) type. However, it is also suitable for encoding images according to any video encoding scheme operating on images split into blocks in which the blocks are encoded according to a plurality of coding modes comprising at least one coding mode of the temporal correlation prediction type using a plurality of images from the video stream to be encoded.

The proposed method may advantageously be implemented in cases where the coding mode of the temporal correlation prediction type using a plurality of images from the set of images is of the type using a motion prediction based on previously coded images (the type of coding mode referred to in certain video coders by the name "Inter") or of the type using a predetermined predictor vector selected from previously coded blocks adjacent to the current block (type of coding mode referred to in certain video encoders by the name "Skip").

In a particular implementation of the proposed method, the method also comprises: determining a plurality of N motion estimation vectors of the current block, N being an integer greater than or equal to two, each motion estimation vector pointing respectively to a block correlated with the current block in N respective images distinct from the first image and previously coded according to the encoding sequence, and in distinct pairs. In this particular implementation, the visual distortion metric also uses respective distances between a temporal prediction vector of the current block pointing to one among the respective images and one among the plurality of N motion estimation vectors of the current block pointing to said one among the respective images.

Taking into account two or more motion estimation vectors and two or more prediction vectors corresponding respectively to the motion estimation vectors makes it possible to refine the measurement of visual distortion for the coding mode considered and to better take into account the motion in the set of images.

In a particular implementation of the proposed method, the visual distortion metric for the coding mode of the temporal correlation prediction type using N images from the set of images, N being an integer greater than or equal to 1, is in the form: $\Sigma_{i=1}^{N} \text{dist}(v_{t,i}, v_{ME,i})$, where $\text{dist}(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously encoded according to the encoding sequence, and an $i^{th}$ temporal prediction vector, $v_{t,i}$ among N temporal prediction vectors of the current block, pointing to the same image as the motion estimation vector $v_{ME,i}$.

In a particular implementation of the proposed method, the visual distortion metric for the coding mode of the temporal correlation prediction type using N images from the set of images, N being an integer greater than or equal to 1, is in the form: $C \times \lambda \times M_{blockSize} \times \Sigma_{i=1}^{N}(K_i \times \text{dist}(v_{t,i}, v_{ME,i}))$, where C is a normalization constant, $\lambda$ is a Lagrange multiplier coefficient, $\text{dist}(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously encoded according to the coding sequence, and an $i^{th}$ temporal prediction vector, $v_{t,i}$ among N temporal prediction vectors of the current block, pointing to the same image as the motion estimation vector $v_{ME,i}$, $K_i$ is a degree of confidence of the $i^{th}$ motion estimation vector $v_{ME,i}$, and $M_{blockSize}$ is a normalization constant determined as a function of the size of the current block.

The plurality of coding modes can also comprise a spatial correlation prediction coding mode of the Intra type.

In a particular implementation of the proposed method, the visual distortion metric includes a confidence factor for the motion estimation. This makes it possible to weight the impact of the motion estimation on the visual distortion measurement. The motion estimation can in fact generate vectors that are more or less accurate depending on the quality of the estimator used or under particular circumstances (very noisy video source, object appearing or disappearing from one image to another).

Advantageously, the confidence factor will be determined relative to the inverse of a measurement of correlation between the current block and its movement according to a motion estimation vector.

In a particular embodiment, the proposed method also comprises: determining a plurality of values of a decision criterion for respectively different test coding modes of the current block, the decision criterion comprising the visual distortion metric; and selecting a coding mode corresponding to a minimum of the respective values of the decision criterion for the different test coding modes of the current block.

The proposed method can also be carried out within the context of an optimization of a decision criterion based on which a coding mode of the current block is selected by the encoder.

The decision criterion can advantageously be chosen in the form: $J'=D+\lambda R+D'$, where D is a distortion metric introduced by the encoding, measuring the correlation between the current block and the predicted block, $\lambda$ is a Lagrange multiplier coefficient, R represents a coding rate, and D' is a visual distortion metric.

The quality of the rate-distortion optimizations implemented in a standard fashion in the encoders can thus be improved by integrating into a rate-distortion decision criterion measuring an objective distortion, a subjective distortion measurement such as proposed above. This visual distortion (or subjective distortion) measurement is based on the motion of the image, and can be used to automatically influence the choice of encoder and to avoid the artefacts which cannot be detected by objective distortion measurements.

For a test coding mode of the temporal correlation prediction type using two images from the set of images, the visual distortion metric D' can advantageously be chosen in the form:

$$D'=C\times\lambda\times M_{blockSize}\times(K_{L0}\times\text{dist}(vL0_p, vL0_{ME})),$$

where C is a normalization constant, $\lambda$ is the Lagrange multiplier coefficient, $\text{dist}(vL0_p, vL0_{ME})$ is a distance between the first temporal prediction vector, $vL0_p$, and the first motion estimation vector, $vL0_{ME}$, $K_{L0}$ is a degree of confidence of the first motion estimation vector $vL0_{ME}$, and $M_{blockSize}$ is a normalization constant determined as a function of the size of the current block.

For a test coding mode of the temporal correlation prediction type using three images from the set of images, the visual distortion metric D' can advantageously be selected in the form:

$$D'=C\times\lambda\times M_{blockSize}\times(K_{L0}\times\text{dist}(vL0_p, vL0_{ME})+K_{L1}\times\text{dist}(vL1_p, vL1_{ME})),$$

where C is a normalization constant, $\lambda$ is the Lagrange multiplier coefficient, $\text{dist}(vL0_p, vL0_{ME})$ is a distance between the first temporal prediction vector, $vL0_p$, and the first motion estimation vector, $vL0_{ME}$, $K_{L0}$ is a degree of confidence of the first motion estimation vector $vL0_{ME}$, and $M_{blockSize}$ is a normalization constant determined as a function of the size of the current block.

For a test coding mode of the spatial correlation prediction type, the visual distortion metric D'can advantageously be defined as being a predetermined constant.

According to a second aspect, a device is proposed for encoding images comprising an input interface configured for receiving a first image from a set of images, and an image encoding unit, operatively coupled to the input interface, and configured for encoding each block according to one among a plurality of coding modes comprising at least one coding mode of the temporal correlation prediction type using a plurality of images from the set of images according to the proposed method.

According to another aspect, a computer program is proposed, which can be loaded into a memory associated with a processor, and comprising portions of code for implementing the steps of the proposed method during the execution of said program by the processor, as well as a data set representing said computer program, for example by way of compression or encoding.

Another aspect relates to a non-transitory storage medium of a computer-executable program, comprising a data set representing one or more programs, said one or more programs comprising instructions for causing the computer to encode a first image split into blocks according to the proposed method, during the execution of said one or more programs by a computer comprising a processing unit operatively coupled to memory means and to an input/output interface module.

BRIEF DESCRIPTION OF THE DRAWINGS

Other features and advantages of the present invention will become apparent from the following description of non-limitative embodiment examples, with reference to the attached drawings, in which:

FIGS. 2a, 2b, and 2c are diagrams illustrating Intra prediction modes;

DETAILED DESCRIPTION OF THE PREFERRED EMBODIMENTS

In the following detailed description of embodiments of the invention, numerous specific details are presented in order to provide a more complete understanding. Nevertheless, a person skilled in the art can appreciate that embodiments can be put into practice without these specific details. In other cases, well-known characteristics are not described in detail in order to avoid unnecessarily complicating the description.

The proposed method can be implemented by any type of encoder of an image from a set of images using a coding mode of the temporal correlation prediction type using a plurality of images from the set of images, such as for example a video codex conforming to the standards H.264/AVC, H.265/HEVC, and/or MPEG-2.

Figure 1:
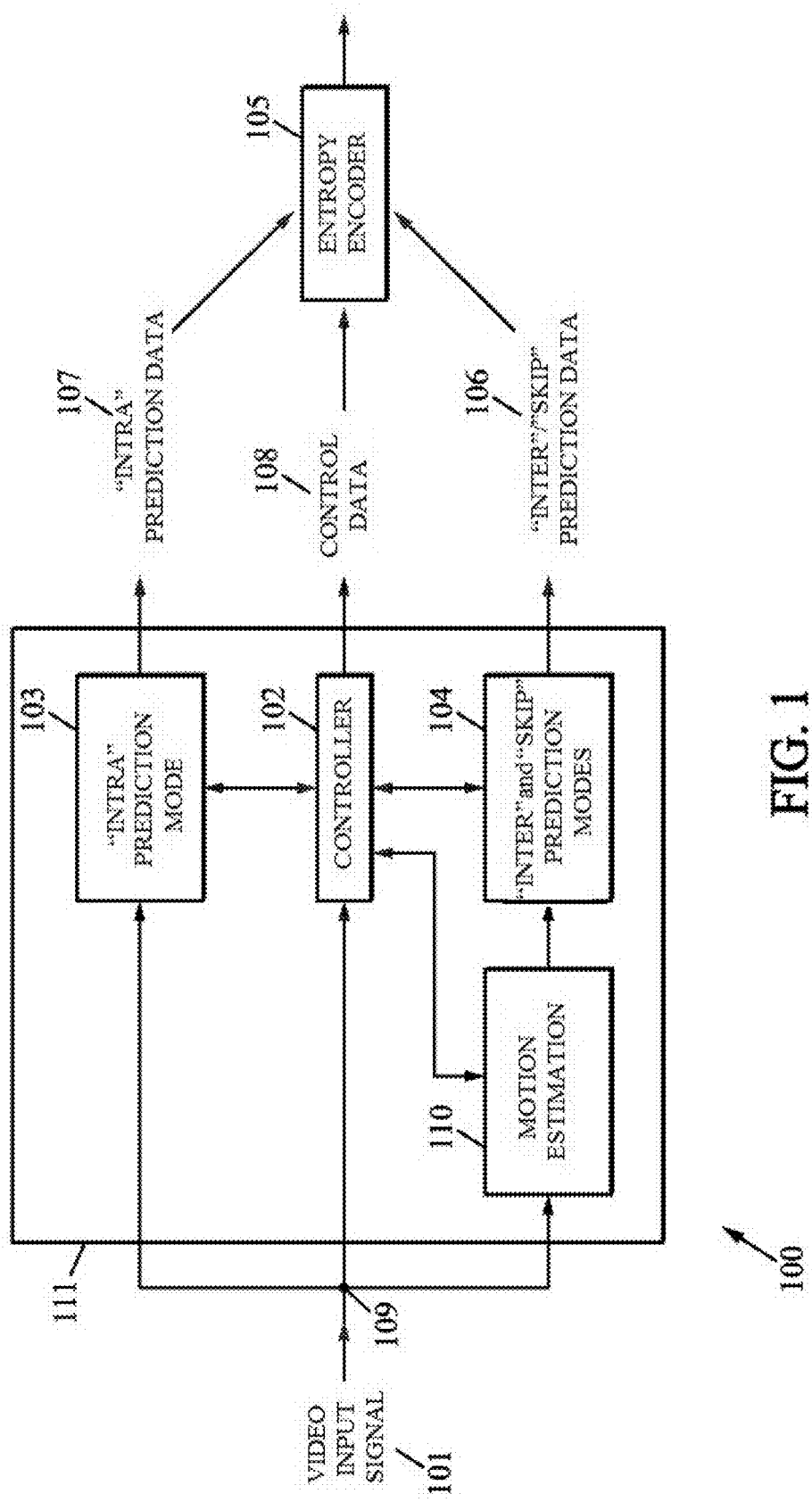
FIG. 1 is a diagram illustrating the architecture of an encoder for implementing the proposed method.

With reference to FIG. 1, the encoder 100 receives at its input 109 a video input stream 101 comprising a plurality of images to be processed in order to carry out the encoding of the stream. The encoder 100 comprises a controller 102, operatively coupled to the input interface 109, which controls a motion estimation unit 110 and a prediction unit 104 for the Inter and Skip predictions, as well as an Intra-mode prediction unit 103. The data received at the input interface 109 are transmitted to the input of the Intra-mode prediction unit 103, motion estimation unit 110, Inter/Skip prediction unit 104 and controller 102. The assembly comprising the controller 102, motion estimation unit 110, prediction unit 104 for the Inter and Skip predictions, and Intra-mode prediction unit 103 forms an encoding unit 111 operatively coupled to the input interface 109.

The Intra-mode prediction unit 103 generates Intra prediction data 107 which are provided to the input of an entropy encoder 105. As for the motion estimation unit 110, it generates motion estimation data which are provided to the controller 102 as well as to the Inter/Skip-mode prediction unit 104 for the purpose of the Inter-mode prediction. The Inter/Skip-mode prediction unit 104 generates Inter or Skip prediction data which are provided to the input of the entropy encoder 105. For example, the data provided to the decoder for an Inter-type prediction can comprise a residual of pixels and information relating to one or more motion vectors. This information relating to one or more motion vectors can comprise one or more indices identifying a predictor vector in a list of predictor vectors known to the decoder. The data provided to the decoder for a Skip-type prediction will typically not comprise any residual of pixels, and may also comprise information identifying a predictor vector in a list of predictors known to the decoder. The list of predictor vectors used for the Inter-type coding will not necessarily be identical to the list of predictor vectors used for the Skip-type coding. The controller 102 generates control data 108 which are also provided to the input of the entropy encoder 105.

The controller 102 is configured for controlling the Intra-mode prediction unit 103 and the Intra/Skip-mode prediction unit 104 in order to control the prediction data which are respectively provided to the input of the entropy encoder 105 by the Intra-mode prediction unit 103 and the Inter/Skip-mode prediction unit 104. Depending on the encoding scheme implemented by the encoder 100, the controller 102 can also be configured for selecting, from the different types of prediction mode (Intra mode, Inter mode or Skip mode, depending on the coding modes implemented in the encoding unit 111), that for which prediction data will be transmitted to the entropy encoder 105. Thus, the encoding scheme can comprise a decision for each set of images processed, aimed at choosing the type of prediction for which data will be transmitted to the entropy encoder 105. This choice will typically be implemented by the controller, for deciding on the application of Inter prediction mode, Intra prediction mode or Skip prediction mode to the block being processed. This makes it possible to command sending to the entropy encoder, Intra prediction data 107 or Inter or Skip prediction data 106 depending on the decision taken by the controller 102.

The encoder 100 can be a computer, a computer network, an electronic component, or any other apparatus comprising a processor operatively coupled to a memory, as well as, according to the selected embodiment, a data storage unit, and other associated material elements such as a network interface and a medium reader for reading a removable storage medium and writing on such a medium (not shown in the figure). The removable storage medium can be, for example, a compact disc (CD), a video/digital versatile disc (DVD), a flash disc, a USB stick, etc. Depending on the embodiment, the memory, the data storage unit or the removable storage medium contains instructions which, when they are executed by the controller 102, cause this controller 102 to carry out or control the parts: input interface 109, Intra-mode prediction 103, Inter/Skip-mode prediction 104, motion estimation 110 and/or processing of data in examples of implementation of the proposed method described herein. The controller 102 can be a component implementing a processor or a calculation unit for encoding images according to the proposed method and the control of the units 109, 110, 103, 104, 105 of the encoder 100.

Moreover, the encoder 100 can be implemented in software form, as described above, in which case it takes the form of a program that can be executed by a processor, in hardware form, such as an application-specific integrated circuit (ASIC), a system on a chip (SOC) or in the form of a combination of hardware and software elements, such as for example a software program intended for loading and executing on a component of the FPGA (Field Programmable Gate Array) type. SOCs (system on chip) are embedded systems which integrate all the components of an electronic system in a single chip. An ASIC (application-specific integrated circuit) is a specialized electronic circuit which combines custom-made functionalities for a given application. ASICs are generally configured during their manufacture and cannot be simulated by the user. Programmable logic circuits of the FPGA (Field-Programmable Gate Array) type are electronic circuits that can be reconfigured by the user.

An encoder can also use hybrid architectures, such as for example architectures based on a CPU+FPGA, a GPU (Graphics Processing Unit) or an MPPA (Multi-Purpose Processor Array).

The image currently being processed is split into blocks or coding units (CUs), the form and size of which are determined as a function in particular of the size of the matrix of pixels representing the image, for example in square-shaped macroblocks of 16×16 pixels. Thus a set of blocks is formed, for which a processing sequence (also called a "processing path") is defined. In the case of square-shaped blocks, it is possible for example to process the blocks of the current image starting with that situated at the top left of the image, followed by that immediately to the right of the preceding one, until the end of the first line of blocks is arrived at, in order to then pass to the block furthest to the left in the line of blocks immediately below this first line, in order to finish the processing with the block furthest to the bottom and to the right of the image.

Thus a current block (sometimes called an "original block") is considered, i.e. a current block being processed in the current image. The processing of the current block can comprise dividing the block into sub-blocks, in order to process the block with a finer spatial granularity than that obtained with the block. The processing of a block moreover comprises the prediction of the pixels of the block, by exploiting the spatial (in the same image) or temporal (in the previously coded images) correlation between the pixels. When several types of prediction, such as for example, an Intra-type prediction, an Inter-type prediction and/or a Skip-type prediction, are implemented in the encoder, the prediction of the pixels of the block typically comprises the selection of a type of prediction of the block and prediction information corresponding to the type selected, the whole forming a set of encoding parameters.

The prediction of the block of pixels processed makes it possible to calculate a residual of pixels which corresponds to the difference between the pixels of the current block and the pixels of the prediction block and, in certain cases, is transmitted to the decoder after transform and quantification.

For coding a current block, several coding modes are thus possible and it is necessary to include in the general data generated by the encoding, coding data 106-108 signalling the choice of coding mode which has been carried out during the encoding and according to which the data have been encoded. These coding data 106-108 can in particular comprise the coding mode (for example the particular type of predictive coding among the "Intra" and "Inter" codings, or among the "Intra", "Inter" and "Skip" codings), the division (in the case of one or more blocks divided into sub-blocks), as well as motion data (106) in the case of a predictive coding of the "Inter" or "Skip" type, and an Intra prediction mode 107 in the case of a predictive coding of the "Intra" type. As indicated above for the "Inter" and "Skip" coding modes, these last two data can also be predicted in order to reduce their coding cost, for example by exploiting the data from the blocks adjacent to the current block.

Examples of "Intra", "Inter" and "Skip" prediction modes are described below, in order to facilitate understanding of the implementation of the proposed method for video coding using these prediction modes.

As indicated above, predictive coding in "Intra" mode includes a prediction of the pixels of a block (or set) of pixels currently being processed using the previously coded pixels of the current block. Different predictive coding modes of the "Intra" type exist, some of which are described below:

In the "Intra" prediction mode known as "DC" (discrete continuous), the values of the pixels adjacent to the current block, belonging to blocks which have been previously coded are used, and an average of the values of these adjacent pixels is calculated. The predictive block is constructed using the average value obtained for each pixel.

Figures 2A, 2B:
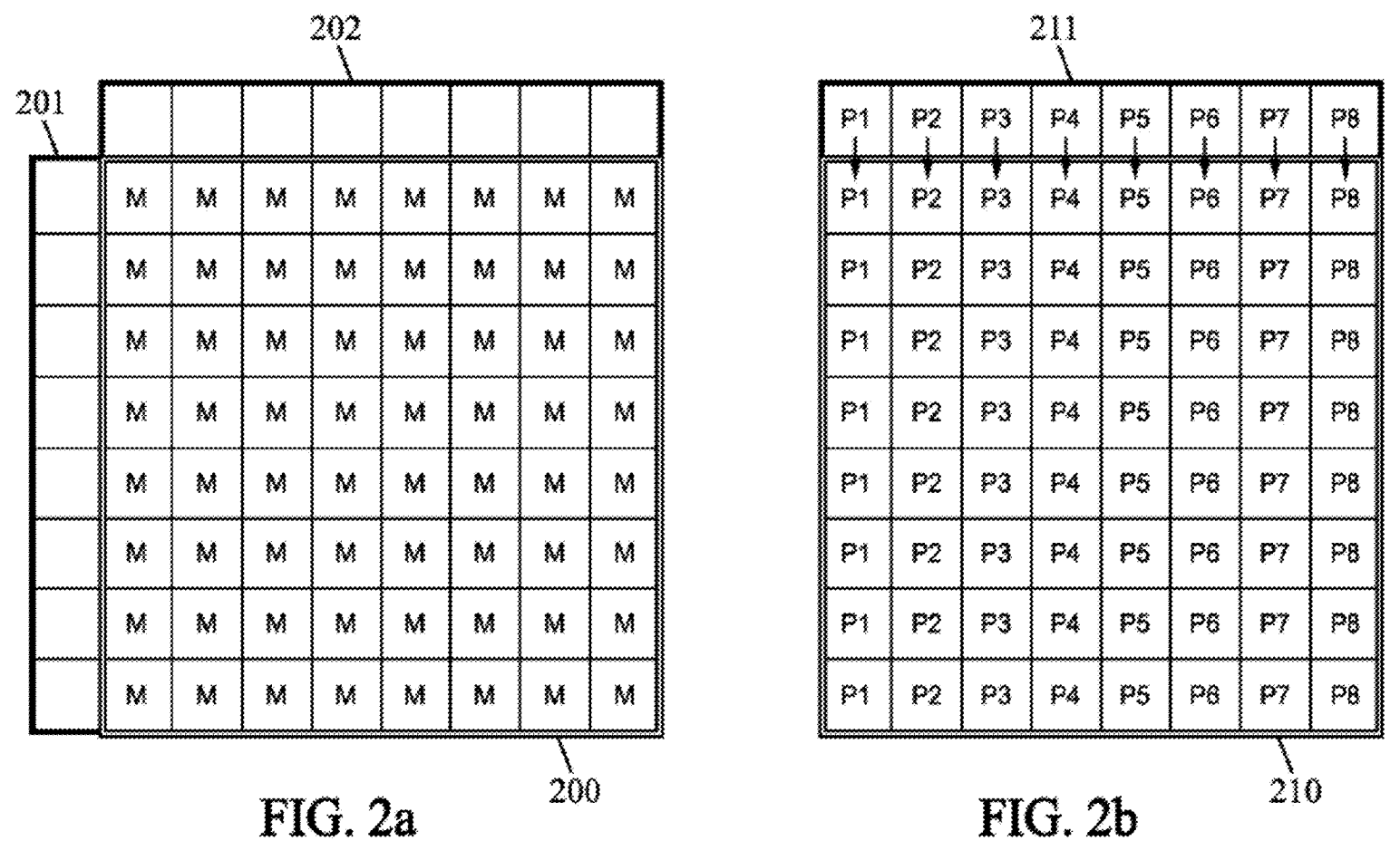

For example, if a block 200 of 8×8 pixels such as that shown in FIG. 2a is considered, the two sets of 8 adjacent pixels 201, 202 of the adjacent block arranged to the left of the current block and of the adjacent block arranged above the current block are used. An average value M of the values of these 16 pixels is calculated, which is used to fill in the values of the pixels of the predictive block 200.

In the "Intra" prediction mode known as "V" (for "Vertical"), the values of the pixels adjacent to the current block, belonging to the adjacent block arranged above the current block are used, when these adjacent pixels have been previously coded, and the value of each adjacent pixel is copied for the pixels of the corresponding column in the predictive block.

For example, if a block 210 of 8×8 pixels such as that shown in FIG. 2b is considered, for example the set of 8 adjacent pixels 211 of the adjacent block arranged to the left of the current block is used, in the case where the coding program is such that this block has already been coded. The value of each of the 8 adjacent pixels is copied into the corresponding column of the predictive block 210.

In the "Intra" prediction mode known as "H" (for "Horizontal"), the values of the adjacent pixels of the current block belonging to the adjacent block arranged to the left or to the right of the current block are used, when these adjacent pixels have been previously encoded, and the value of each adjacent pixel is copied for the pixels of the corresponding line in the predictive block.

In the "Intra" prediction mode known as "VL" (for "Vertical-Left"), the values of the pixels adjacent to the current block, belonging to the adjacent block arranged immediately above and above to the right of the current block are used, when these adjacent pixels have been previously coded, and the value of each adjacent pixel is copied for the pixels in the corresponding column in the predictive block.

Figure 2C:
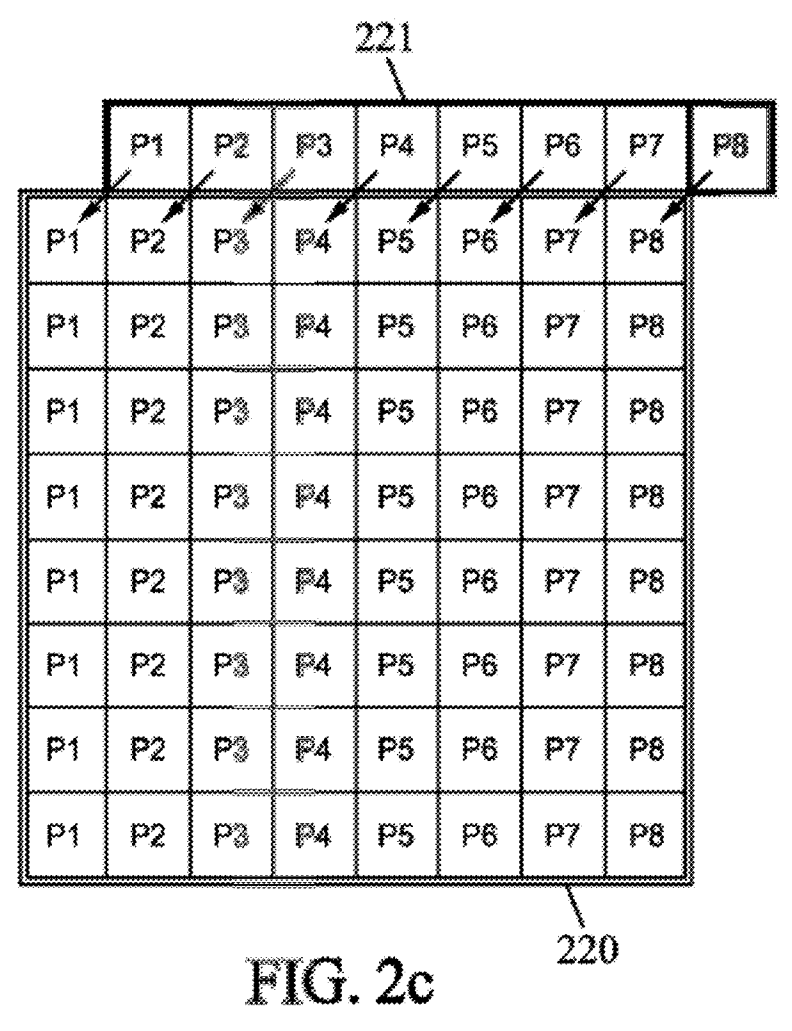

For example, if a block 220 of 8×8 pixels such as that shown in FIG. 2c is considered, for example the set of 8 adjacent pixels 221 in the two adjacent blocks arranged respectively immediately above and immediately to the right of the current block is used, in the case where the block coding program is such that these adjacent blocks, or at least the adjacent pixels considered, have already been encoded. The value of each of the 8 adjacent pixels is copied into the corresponding column of the predictive block 220 in a left diagonal projection direction as shown in FIG. 2c.

The video coding standard H.264/AVC provides for 9 Intra prediction modes (including the prediction modes DC, H, V, VL described above). As for the video coding standard HEVC, it provides for a greater number of 35 Intra prediction modes.

These video coding standards moreover provide particular cases for carrying out an Intra prediction. For example, the standard H.264/AVC allows for dividing blocks of 16×16 pixels into smaller blocks, the size of which can go up to 4×4 pixels in order to increase the granularity of the predictive coding processing.

As indicated above, the Intra prediction mode information is predicted in order to reduce its encoding cost. In fact, transmission in the encoded stream of an index identifying the Intra prediction mode has a cost that is higher, the greater the number of prediction modes that can be used. Even in the case of H.264/AVC coding, the transmission of an index between 1 and 9 identifying the Intra prediction mode used for each block among the possible 9 modes proves to be expensive in terms of coding cost.

Thus the MPM (most probable mode) is calculated, which is used for coding, on a minimum number of bits, the most probable Intra prediction mode. The MPM is the result of the prediction of the Intra prediction mode used for coding the current block.

When the Intra mode is selected for encoding the current block, it will be possible to transmit to the decoder typically the residual of pixels and the MPM.

The predictive coding in the mode referenced for certain video coders by the name "Inter" includes a prediction of the pixels of a block (or set) of pixels currently being processed using pixels originating from previously coded images (pixels which do not originate from the current image, unlike the Intra prediction mode).

The Inter prediction mode typically uses one or two sets of pixels situated in one or two previously encoded images in order to predict the pixels of the current block. That said, it is possible to envisage, for an Inter prediction mode, the use of more than two sets of pixels situated respectively in previously coded images in distinct pairs, and the number of which is greater than two. This technique, called motion compensation, involves determining one or two vectors, known as motion vectors, which respectively indicate the position of the set or sets of pixels to be used for the prediction in the image or images previously coded (sometimes called "reference images"). With reference to FIG. 1, the vectors used for the "Inter" mode are to be chosen by the encoder 100 via the motion estimation unit 110 and the Inter/Skip-mode prediction unit 104. The implementation of the motion estimation within the encoder 100 can therefore, depending on the case, provide for the determination of a single motion estimation vector (denoted "L0" hereafter) or of two motion estimation vectors (denoted "L0" and "L1" hereafter) which point towards potentially different images.

The motion estimation vector(s) generated at the output of the motion estimation unit 110 will be supplied to the Inter/Skip-mode prediction unit 104 for generating Inter prediction vectors. Each Inter prediction vector will in fact be able to be generated from a corresponding motion estimation vector.

The motion estimation for a current block according to the embodiments is described in more detail below.

The motion estimation can consist of studying the movement of the blocks between two images by exploiting the temporal correlation between the pixels. For a given block in the current image (the "current block" or the "original block") the motion estimation makes it possible to select the most similar block (called the "reference block") in a previously coded image, called the "reference image", by representing the motion of this block for example with a two-dimensional vector (horizontal movement, vertical movement).

The motion estimation method is non-normative and is therefore capable of differing from one encoder to another. For example, the motion estimation method can comprise searching, in a more or less extensive zone, of the reference image, for example defined based on the block of the reference image corresponding to the original block in the image of origin, in order to test the similarity of the original block to a greater or smaller number of candidate blocks of the reference image.

The correlation between a block and its movement according to a motion estimation vector can be calculated using the sum of absolute differences (SAD):

$$SAD = \Sigma_x \Sigma_y |p_{xy} - p'_{xy}| \quad (1)$$

where $p_{xy}$ is the pixel at the position (x,y) of the original block and $p'_{xy}$ the pixel at the position (x,y) of the reference block. A low SAD will be interpreted as an indication that the two blocks are very similar.

The vector originating from the motion estimation, corresponding to the block of the reference image closest to the original block among the tested candidates in the reference image, can serve as a basis for determining the Inter prediction vector. In fact, according to the implementations, the Inter prediction method will be able to include optimizations aimed at selecting a vector distinct from the vector originating from the motion estimation, in order have the least expensive possible prediction for the mode which is tested.

This optimization can for example comprise testing one or more vectors around the vector originating from the motion estimation, capable of giving a better result depending on the objective pursued. Therefore, the vector used for the Inter prediction, in the light of a given reference image, will not necessarily be identical to the vector originating from the motion estimation for this reference image.

When the Inter mode is selected for encoding the current block, it will be possible to transmit to the decoder typically the residual of pixels (calculated for each Inter prediction vector as a function of the pixels of the current block and of the pixels of the block towards which the considered Inter prediction vector points) and information relating to the corresponding Inter prediction vector(s).

However, the Inter prediction vectors can represent a significant cost in video encoders. Certain encoders reduce this coding cost by exploiting the vectors of the blocks adjacent to the current block being encoded. This optimization involves a prediction of the Inter prediction vector(s), like the prediction of the Intra prediction mode in the case of a predictive coding of the block in Intra mode.

As indicated above, the information relating to each Inter prediction vector will also be able to be reduced in size by transmitting, instead of the vector coordinates for example, a predictor vector index in a known dictionary of the encoder and the decoder, and a residual quantifying the distance between the prediction vector and the predictor vector.

For example, in coders of the H.264/AVC type, a median predictor vector $mv_{pred}$ is used to predict the vector to be coded mv:

$$\varepsilon_{mv} = mv - mv_{pred} \quad (2)$$

Only the residual $\varepsilon_{mv}$ is transmitted in the encoded stream, so as to greatly reduce the coding costs.

Figure 3:
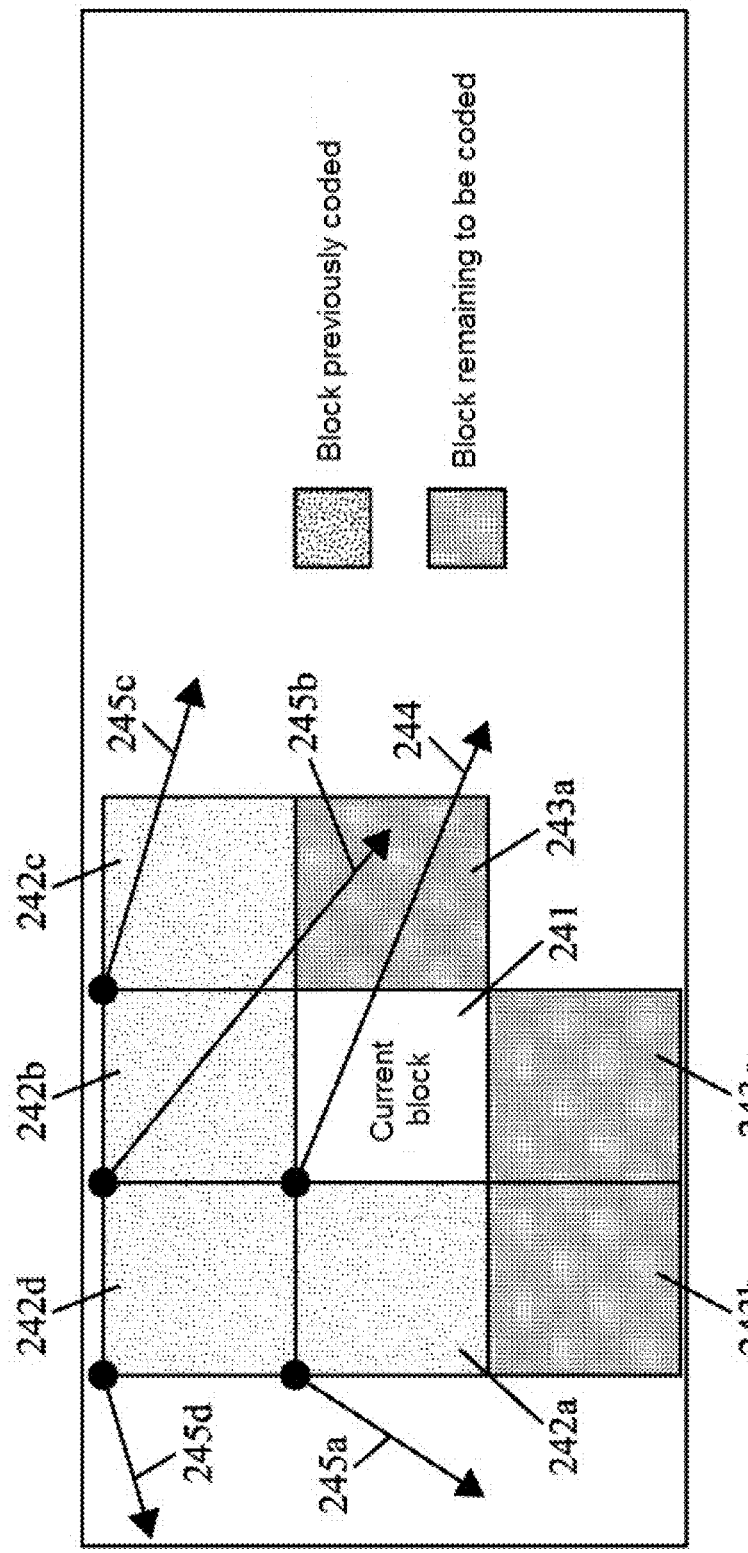
FIG. 3 is a diagram illustrating determination of a median vector for encoding in Inter prediction mode.

FIG. 3 illustrates the determination of a predictor vector corresponding, in the example shown, to the median between the vectors of previously coded adjacent blocks. With reference to FIG. 3, the current block (currently being encoded) 241 is surrounded by four previously encoded adjacent blocks 242a, 242b, 242c, 242d and by three adjacent blocks 243a, 243b, 243c remaining to be coded.

The example presented assumes a path for encoding blocks of the image so that for each current block being encoded, blocks situated to the left of or above the current block have already been encoded, so that, in FIG. 3, the previously encoded adjacent blocks 242a, 242b, 242c, 242d are situated with 242a to the left and 242b, 242c, 242d above the current block 241. The predictor vector $mv_{pred}$ 244 of the current block 241 corresponds to the median between the respective vectors 245a, 245b, 245c, 245d of the previously coded blocks 242a, 242b, 242c or 242a, 242b, 242d when the block 242c is not available for example (for example in the case where the block 242c is encoded according to predictive coding in Intra mode). An incorrect predictor vector will result in an additional coding cost for the current block 241. In another particular case where only one or two adjacent blocks are coded in Inter mode, the standard H.264/AVC provides a rule making it possible to use one of the available vectors insofar as the median cannot be calculated.

Moreover, certain coders, sometimes in the context of the "Inter" prediction mode, use a mode referenced in certain video coders by the name "Skip" in which, as in the case of the Inter mode, the current block is predicted using pixels originating from previously encoded images (one or two images, or even more depending on the implementation). The Skip mode is moreover presented as a sub-mode of the Inter mode, due to the fact that it corresponds to an "Inter" prediction mode without transmission (or generation in the encoded stream) of the prediction vector or of the residual of pixels.

The Skip mode is applied when the residual of pixels is low enough for it to be considered unnecessary to transmit it in the coder output stream. Therefore, information will only be transmitted to the Inter prediction vectors, and the block indicated by a vector in the reference image will be copied in order to generate the current block.

On the other hand, with a view to minimizing the coding cost, the prediction vector(s) used for this mode will typically not be transmitted to the decoder, and will be deduced by the decoder from a predetermined list of possible vectors (called, in the same way as for the "Inter" mode, "predictor vectors"), which will make it possible for example to transmit only the position of the predictor (for example a position index in the list of predictor vectors) instead of transmitting its value (such as for example its coordinates). Thus, for example, in this coding mode, a predictor vector is selected directly from a predetermined list known to the decoder, the selection of the predictor vector being carried out from blocks adjacent to the current block which have been previously coded. As indicated above, in the cases where the Skip and Inter modes implemented in the coder each use a list of predictor vectors, the respective lists of predictor vectors, either due to their size or their respective content, will not necessarily be identical.

Among the Inter, Intra and Skip modes described by way of example, a given mode can have a low cost but generate a visual artifact, which is most often manifested by a blocking effect, as indicated in the article by Zeng et al. entitled "Characterizing Perceptual Artifacts in Compressed Video Streams", Human Vision and Electronic Imaging XIX, Proc. SPIE, vol. 9014. This fault can occur when the vector assigned to a block does not represent the real motion, for example a portion of an image containing the block in motion over a sequence of images. In this case it is manifested by a discontinuity at the boundaries of the blocks and can produce false contours or entire blocks that are incorrectly positioned.

In the case where a better visual quality is sought, it can be preferable to choose a mode with a higher cost which does not generate visual artifacts.

The defects are all the more visible when the chosen mode is a Skip mode, as the absence of residual means that in the case where the Skip vector is incorrect from a visual quality point of view, the decoder will copy an incorrect block as it is. As the Skip mode is a mode which is not very expensive due to the small amount of information generated at the encoder output, the algorithm for selecting the coding mode used by the encoder can have a tendency to choose this mode too often in order to reduce the video bitrate, which it does at the expense of visual quality.

Similarly, as a function of the algorithm of the Inter prediction vector selection used, the encoder can decide to choose an Inter prediction vector that is too great a distance from the vector obtained by the motion estimation (for example in the case where the chosen vector requires a lower coding cost than the vector originating from the motion estimation), but this distance can produce a motion inconsistent with the original motion of the video, and thus generate a blocking effect characteristic of an undesirable visual artifact.

According to an aspect, a method for selecting the coding mode is proposed, which quantifies the "visual quality" of a tested mode in the form of a distortion, in order to thus visually improve the choices of the encoder for all the modes and also to avoid the unwanted Skip problems described above.

In an embodiment, a visual distortion metric is used which reflects the visual quality of the tested mode in addition to, or as an alternative to, the objective distortion metrics such as the sum of absolute differences (SAD) or the mean square error (MSE). For a coding mode of the temporal correlation prediction type, such as for example a mode of the Inter- or Skip-type coding mode, such as those described above, which implements determining a motion estimation vector and a prediction vector, the visual distortion metric proposed uses a distance between the temporal prediction vector and the motion estimation vector corresponding to the same reference image.

Examples of visual distortion metrics are given below, which reveal that a visual distortion metric defined in this way proves inexpensive in terms of calculations and can therefore be integrated within an algorithm for selecting the coding mode of an image encoder or of a video codec, capable of working in real-time or near-real-time mode.

Figure 4A:
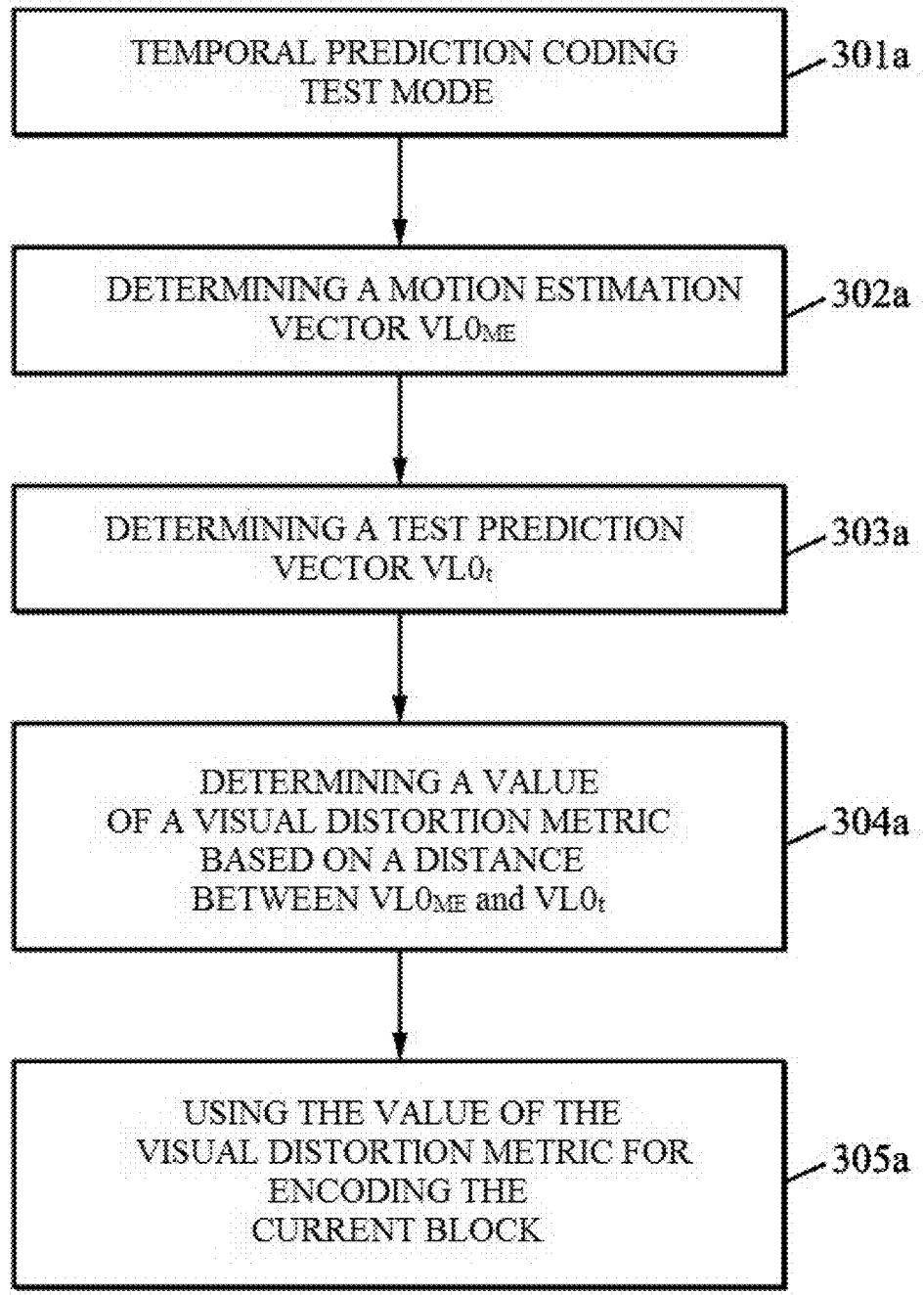
FIGS. 4a and 4b are diagrams illustrating the proposed method according to particular different embodiments of the invention.

FIG. 4a is a diagram illustrating the proposed method according to particular different embodiments of the invention;

The case is envisaged of an image originating from a set of images, for example a sequence of images, and split into blocks, the encoding of which is carried out by encoding the blocks each block being encoded according to one among a plurality of coding modes comprising at least one coding mode of the temporal correlation prediction type using a plurality of images from the sequence of images.

With reference to FIG. 4a, 301a is considered the coding of a current block according to a coding mode of the temporal correlation prediction type using a plurality of images from the sequence of images. In other words, the method for encoding the current block comprises a coding processing of the block according to a coding mode of the temporal correlation prediction type, sometimes called "test mode" or "candidate mode". The encoding of the current block can in fact, depending on the implementations, comprise tests of different coding modes, of the same type (Inter, Intra and/or Skip) or of different types, in order to select a mode considered as optimum.

For the tested temporal prediction coding mode, in 302a a motion estimation vector of the current block is determined, denoted $vL0_{ME}$. This determination of a motion estimation vector comprises the selection from a sequence of images, of a reference image previously encoded with respect to the current mode (according to an encoding sequence of the images in the sequence) towards which the motion estimation vector of the current block points.

In 303a a test prediction vector is then determined for the current block, denoted $vL0_t$, which points towards the reference image selected during the motion estimation.

In 304a, a difference between the motion estimation vector $vL0_{ME}$ and the test prediction vector $vL0_t$ is then calculated, which supplies a value of the visual distortion metric for the tested mode.

In 305a this value of the visual distortion metric is used for encoding the current block, for example for selecting a coding mode of the current block.

Figure 4B:
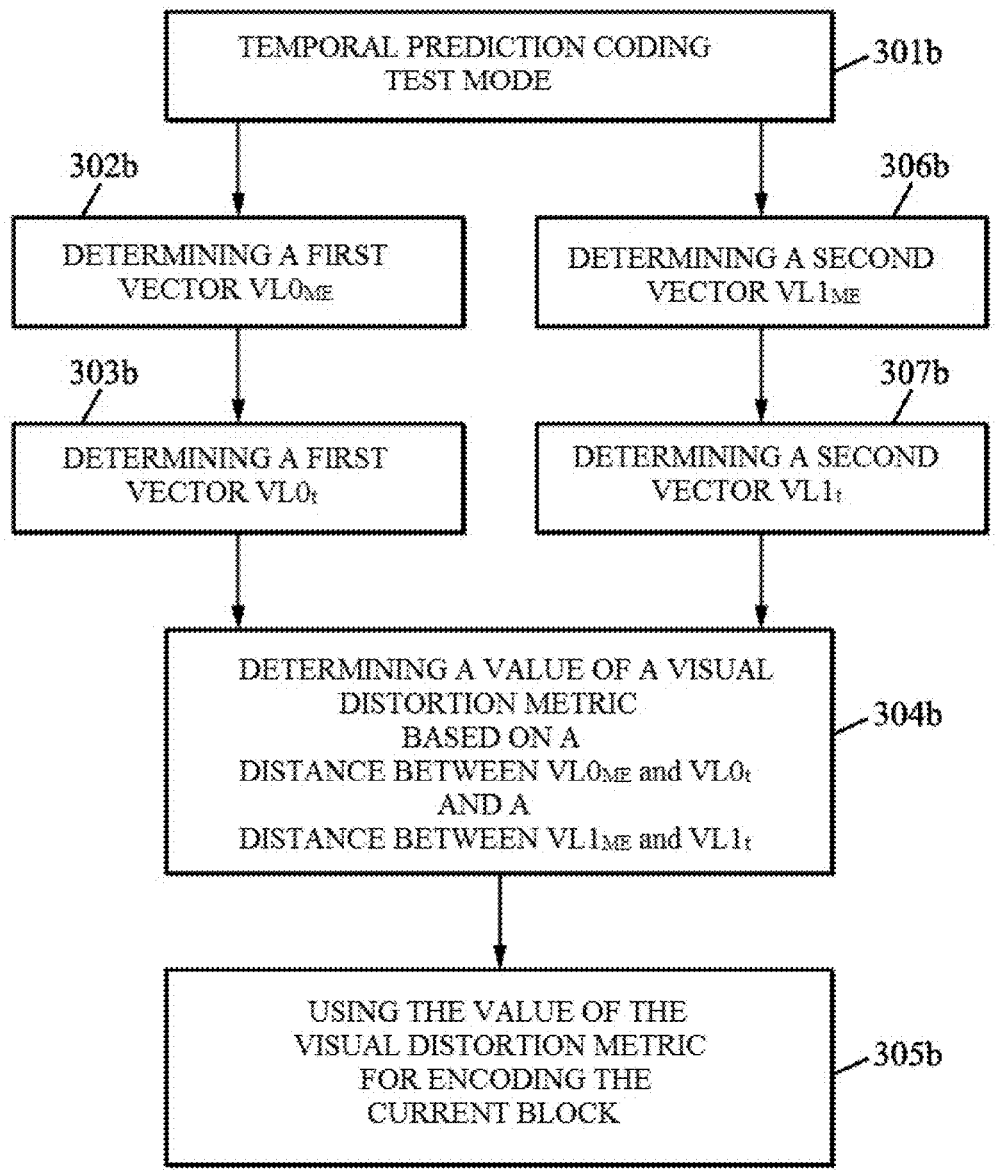

In a particular embodiment, the determination of the value of the visual distortion metric can involve a plurality of motion estimation vectors and corresponding prediction vectors, as shown in FIG. 4b which shows the use of two motion estimation vectors and two prediction vectors.

With reference to FIG. 4b, in 301b the coding of a current block according to a coding mode of the temporal correlation prediction type using a plurality of images from the sequence of images is considered.

For the tested temporal prediction coding mode, in 302b and 306b, first and second motion estimation vectors of the current block are determined, denoted $vL0_{ME}$ and $vL1_{ME}$ respectively. These determinations of motion estimation vectors can be carried out in parallel, or one after the other. They comprise respectively the selection, from the sequence of images, of a first and a second reference image, each previously encoded with respect to the current image (according to an encoding sequence of the images of the sequence) towards which the motion estimation vectors of the current block respectively point.

In 303b and 307b first and second test prediction vectors for the current block are then determined, respectively denoted $vL0_t$ and $vL1_t$, respectively associated with the motion estimation vectors in that they respectively point towards the first and second reference images selected during the motion estimation.

In 304b, a first difference between the first motion estimation vector $vL0_{ME}$ and the first test prediction vector $vL0_t$, and a second difference between the second motion estimation vector $vL1_{ME}$ and the second test prediction vector $vL1_t$ are then calculated and a value of the visual distortion metric is determined for the tested mode, based on these first and second differences.

In 305b this value of the visual distortion metric is used for encoding the current block, for example for selecting a coding mode of the current block.

Depending on the implementation of the encoder, the methods described above with reference to FIGS. 4a and 4b can be implemented in the context of an encoding method which selects a coding mode for the current block after testing a plurality of coding modes and selects from the tested modes a coding mode considered as optimum with regard to a predetermined criterion (sometimes called "local decision criterion"). In this case, the visual distortion metric defined above can be used to select the optimum coding mode while being integrated in the local decision criterion.

In a particular embodiment, the visual quality of the tested mode is thus taken into account by introducing a visual distortion metric into a local decision criterion (i.e. for encoding the current block). The rate-distortion optimization in fact usually consists of minimizing a local decision criterion. A conventional example of such a criterion, denoted J, is given hereafter: J=D+λR, where D denotes the distortion, λ is a Lagrange multiplier and R denotes the rate associated with coding the estimated decision.

The local decision criterion is evaluated for a plurality of available coding modes, for example for each available coding mode, and the mode minimizing the criterion is selected. In the criterion J, the distortion D can be calculated using so-called "objective" metrics such as the SAD (1) defined above or the mean square error (MSE):

$$MSE = \frac{1}{n}\Sigma_x\Sigma_y(p_{xy} - p'_{xy})^2 \quad (3)$$

where $p_{xy}$ is the pixel at the position (x,y) of the original block and $p'_{xy}$ the pixel at the position (x,y) of the reference block and n the number of pixels in the block.

The conventional criterion J=D+λR, based on determining the distortion using objective metrics, does not therefore include taking into account the visual quality of the tested mode.

In this particular embodiment, the local decision criterion J is modified in order to introduce into it a visual distortion measurement (also called "subjective distortion"). For example, the criterion J is modified to an improved criterion, denoted J', stated hereafter: J'=D+D'+λR (4) where D is the objective distortion, D' is the subjective distortion, λ the Lagrange multiplier and R the coding rate.

The choice of coding mode made on the basis of the modified criterion J' allows the encoder to take the visual quality into account in its decision. According to a particular embodiment, for each tested mode, the value of a rate-distortion optimization criterion is calculated, including a subjective distortion measurement, such as for example the criterion J' stated above, and the coding mode minimizing this criterion is selected for encoding the current block.

The modes tested can include several modes corresponding to the same type of prediction, for example among the Inter, Intra and/or Skip types described above. In particular it is possible to test several candidate Inter prediction vectors identified by an Inter prediction algorithm generating a plurality of candidate vectors (for example from 1 to 10 candidate vectors) based on the vector originating from the motion estimation. Each candidate vector can represent a distinct tested mode, so that there will be several tested candidate modes for the Inter-type prediction.

The choice of coding mode can thus comprise the selection of encoding parameters of the current block corresponding to a type of prediction among the (Inter, Intra and/or Skip) types of prediction available for encoding.

In an embodiment, the subjective distortion D' measures, for an Inter- or Skip-type prediction, the distance between the prediction vector and the vector originating from the motion estimation. In this way, the mode with the lowest possible cost is chosen, while remaining consistent with the motion of the image. The further the Inter- or Skip-type mode prediction vector is from the motion estimation vector, the more it is considered visually "incorrect", and thus the greater will be the subjective distortion D', which will put the tested mode at a disadvantage and will thus promote modes which will be more visually "correct".

Examples of visual distortion metrics are described below, which are applicable to the coding modes of the temporal prediction type, for example to modes of the Inter and Skip types described above.

In a particular embodiment, for coding modes which use a temporal prediction based on a previously coded image, the visual (or subjective) distortion can be measured by means of a metric, denoted D', in the form:

$$D'=\text{dist}(vL0_t, vL0_{ME}) \quad (5).$$

dist($vL0_t$, $vL0_{ME}$) is the distance between the temporal prediction vector currently being tested "$vL0_t$", and the vector obtained by the motion estimation "$vL0_{ME}$".

There are several other ways of defining the distance between two vectors $v_1(x_1,y_1)$ and $v_2(x_2,y_2)$.

In a particular mode, the Euclidean distance defined by the following formula is used:

$$\text{dist}(v_1,v_2)=\sqrt{(x_1-x_2)^2+(y_1-y_2)^2} \quad (6)$$

In another particular embodiment, the visual distortion metric D' defined above can be adapted to the case of a coding mode which uses a temporal prediction based on two previously coded images, in order to take the following form:

$$D'=\text{dist}(vL0_t, vL0_{ME})\text{dist}(vL1_t, vL1_{ME}) \quad (7).$$

dist($vL0_t$, $vL0_{ME}$) is the distance between the first temporal prediction vector currently being tested "$vL0_t$", and the first vector obtained by the motion estimation "$vL0_{ME}$".

dist($vL1_t$, $vL1_{ME}$) is the distance between the second temporal prediction vector currently being tested "$vL1_t$", and the second vector obtained by the motion estimation "$vL1_{ME}$".

The two distances dist($vL0_t$, $vL0_{ME}$) and dist($vL1_t$, $vL1_{ME}$) can be determined according to the formula for calculating the Euclidean distance stated above.

The formulation of the visual distortion metric above can be generalized to the case of a coding mode using a temporal prediction based on N previously coded images, N being an integer greater than or equal to 1, according to the following formula:

$$D'=\Sigma_{i=1}^{N}(\text{dist}(v_{t,i},v_{ME,i})), \quad (8),$$

where dist($v_{t,i}$,$v_{ME,i}$) is a distance between an $i^{th}$ temporal prediction vector being tested, $v_{t,i}$, and an $i^{th}$ vector obtained by the motion estimation, $v_{ME,i}$, the two vectors $v_{t,i}$ and $v_{ME,i}$ pointing to the same image among the N previously coded images.

In a particular embodiment, each distance between a temporal prediction vector and the corresponding motion estimation vector used in determining the visual distortion metric D' is weighted by a confidence factor for the quality of the motion estimation, and consequently for the resulting motion estimation vector.

The motion estimation can in fact give vectors that are more or less accurate depending on the quality of the estimator. It can sometimes happen that a good motion estimator is mistaken, for example in the case of a very noisy video source, or when an object appears or disappears from one image to another (in this case the correct vector does not exist).

This embodiment therefore provides a factor which defines the accuracy of the motion estimation vector used, which has the advantage of making it possible to weight the influence of the motion estimation vector used in calculating the visual distortion.

Thus, each of the visual distortion metrics D' defined above can integrate into a particular embodiment a multiplication factor of each prediction vector-motion vector distance representing the confidence that it is possible to have in the quality of the motion estimation having generated the motion vector.

For example, for a coding mode using a temporal prediction based on a previously coded image, the visual distortion metric can take the form:

$$D'=K_{L0}\times\text{dist}(vL0_p,vL0_{ME}) \quad (9),$$

and for a coding mode using a temporal prediction based on two previously coded images, the visual distortion metric can take the form:

$$D'=K_{L0}\times\text{dist}(vL0_p,vL0_{ME})+K_{L1}\times\text{dist}(vL1_p,vL1_{ME}) \quad (10),$$

where $K_{L0}$ and $K_{L1}$ are respectively the degrees of confidence of the motion estimation vectors $vL0_{ME}$ and $vL1_{ME}$.

In a particular embodiment, the calculation of a degree of confidence of a motion estimation vector is based on the inverse correlation between the current block and its movement according to the motion estimation vector. This correlation can for example be calculated using the sum of absolute differences (SAD), as explained above.

In a particular embodiment in which the value of an objective distortion metric is calculated for a tested coding mode, using a temporal prediction (for example of the Inter or Skip type) using an SAD calculation, this can be based on the SAD calculation result obtained for the motion estimation vector using the inverse function.

Thus, the lower the calculated SAD, the higher will be the degree of confidence, and vice versa.

The degree of confidence used can therefore be in the form:

$$k_v=1/SAD_v \quad (11)$$

The examples of visual distortion metrics defined above can also, in another particular embodiment, integrate a Lagrange multiplier coefficient, denoted λ. This coefficient, advantageously chosen specific to the encoder, makes it possible to take into account the coding rate of the image. The lower the available rate, the higher it will preferably be chosen. The use of this coefficient makes it possible to weight the impact of the visual distortion metric D' on the choice of the coding mode as a function of the available coding rate. If this rate is low, it may be desirable for the encoder to take into account the visual distortion metric, and take decisions on the coding mode promoting a low visual distortion. Conversely, if this rate is high, it may be desirable for the visual distortion metric not to have too great an impact on the decisions on the coding mode taken by the encoder or, in other words, for the encoder not to take too much account of the visual distortion metric. Therefore, at a high rate, the visual artifacts are less present, whereas they are more common at a low rate.

For example, for a coding mode using a temporal prediction based on a previously coded image, the visual distortion metric can take the form:

$$D'=\lambda\times K_{L0}\times\text{dist}(vL0_p,vL0_{ME}) \quad (12),$$

and for a coding mode using a temporal prediction based on two previously coded images, the visual distortion metric can take the form:

$$D'=\lambda\times(K_{L0}\times\text{dist}(vL0_p,vL0_{ME})+K_{L1}\times\text{dist}(vL1_p,vL1_{ME})) \quad (13),$$

where $K_{L0}$ and $K_{L1}$ are respectively the degrees of confidence of the motion estimation vectors $vL0_{ME}$ and $vL1_{ME}$, and where λ is a Lagrange multiplier coefficient.

In another particular embodiment, the examples of visual distortion metrics defined above can also integrate a normalization constant, denoted $M_{BlockSize}$, in order to allow a comparison of visual distortion for blocks of different sizes. In fact, certain codecs make it possible to use blocks of different sizes. The is the case for example of the HEVC codec, which makes it possible to use sizes of blocks ranging from 64 pixels×64 pixels to 8 pixels×8 pixels (blocks of size 64 pixels×64 pixels, 32 pixels×32 pixels, 16 pixels×16 pixels, or 8 pixels×8 pixels). The H.264/AVC codec also makes it possible to use blocks of size 16×16 or 8×8.

In this case, it is desirable to take the size of the block into account in order to obtain distortions which are comparable, for example when the costs of two blocks which do not have the same size are compared.

For example, for a coding mode using a temporal prediction based on a previously coded image, the visual distortion metric can take the form:

$$D'=M_{BlockSize}\times\lambda\times K_{L0}\times\text{dist}(vL0_p,vL0_{ME}) \quad (14),$$

and for a coding mode using a temporal prediction based on two previously coded images, the visual distortion metric can take the form:

$$D'=M_{BlockSize}\times\lambda\times(K_{L0}\times\text{dist}(vL0_p,vL0_{ME})+K_{L1}\times\text{dist}(vL1_p,vL1_{ME})) \quad (15),$$

where $K_{L0}$ and $K_{L1}$ are respectively the degrees of confidence of the motion estimation vectors $vL0_{ME}$ and $vL1_{ME}$, λ is a Lagrange multiplier coefficient and $M_{BlockSize}$ is a normalization constant chosen as a function of the size of the current block being encoded.

In another particular embodiment, the examples of visual distortion metrics defined above can also integrate a normalization constant, denoted C in order to obtain a value of a visual distortion metric D' which is comparable to another distortion measurement (for example the objective distortion measurement of the criterion J' stated above) taken into account in the local decision criterion. This constant can be determined empirically, for example by carrying out tests with the encoder considered and choosing the constant which is suitable for the greatest number of possible cases.

For example, for a coding mode using a temporal prediction based on a previously coded image, the visual distortion metric can take the form:

$$D'=C\times M_{BlockSize}\times\lambda\times K_{L0}\times\text{dist}(vL0_p,vL0_{ME}) \quad (16),$$

and for a coding mode using a temporal prediction based on two previously coded images, the visual distortion metric can take the form:

$$D'=C\times M_{BlockSize}\times\lambda\times(K_{L0}\times\text{dist}(vL0_p,vL0_{ME})+K_{L1}\times\text{dist}(vL1_p,vL1_{ME})) \quad (17),$$

where $K_{L0}$ and $K_{L1}$ are respectively the degrees of confidence of the motion estimation vectors $vL0_{ME}$ and $vL1_{ME}$, and λ is a Lagrange multiplier coefficient and $M_{BlockSize}$ is a normalization constant chosen as a function of the size of the current block being encoded, and C is a normalization constant chosen as a function of the values of the other distortion metrics taken into account in the local decision criterion.

There again, the expression of the visual distortion metric can be generalized to the case of a coding mode using a temporal prediction based on a plurality of N previously coded images, N being an integer greater than or equal to two, in which case the visual distortion metric can take the form:

$$D' = C \times \lambda \times M_{blockSize} \times \Sigma_{i=1}^{N}(K_i \times dist(v_{t,i}, v_{ME,i})) \qquad (18)$$

where C is a normalization constant, λ is a Lagrange multiplier coefficient, $dist(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously coded according to the encoding sequence, and an $i^{th}$ temporal prediction vector, $v_{ti}$ among N temporal prediction vectors of the current block, pointing to the same image as the motion estimation vector $v_{ME,i}$, $K_i$ is a degree of confidence of the $i^{th}$ motion estimation vector $v_{ME,i}$, and $M_{blockSize}$ is a normalization constant determined as a function of the size of the current block.

The motion not taken into account for coding a block in Intra mode, a distortion value which would depend on the motion, should not be determined for this mode. Nevertheless, a subjective distortion D' must still be taken into account in the local decision criterion used, in order to be able to compare the different costs obtained for the tested modes, without promoting one mode with respect to another.

In a particular embodiment, a subjective distortion D' is added to the objective distortion D in order to obtain the cost of an Intra mode according to formula (4) above (J'=D+D'+λR). The cost of the Intra mode, calculated by the local decision criterion to be minimized J'=D+D'+λR, can thus be compared with the costs of the other modes. This subjective distortion value defined for the Intra modes has the advantage of avoiding promoting the Intra mode at the expense of other coding modes tested against the same local decision criterion. For the Intra mode it will for example be possible to use a distortion D' of a fixed value obtained empirically.

An example is described below, of implementation of the proposed method in the case of an encoder using Intra-, Inter- and Skip-type prediction modes as defined by the HEVC standard.

The example presented corresponds to the case of a decision between the two Skip and Intra modes for a given block. The proposed method is applied in order to calculate the cost of each mode.

The algorithm for selecting the encoder mode can for example test the Skip mode, the Inter mode and the Intra mode in order to choose the best mode.

Skip Mode Test:

With reference to FIG. 1, the motion estimation 110 supplies a set of motion vectors in the form $(v_{ME,0} \ldots v_{ME,N})$ with N the number of possible reference images for this block. The Inter/Skip prediction unit 104 generates a list of candidates for the Skip mode, called Skip prediction candidates, in the form $\{cand_0, \ldots cand_K\}$ where K is the number of candidates and where each candidate is in the form $cand_i=(p_{i,0}, \ldots p_{i,N})$ with N the number of possible reference images.

For each Skip prediction candidate $cand_i$, the encoding unit 111 carries out the following operations:
Calculation of the coding rate R.
Calculation of the objective distortion D.
Calculation of the subjective distortion D' using formula (18) above and the set of vectors originating from the motion estimation.

$$D'_i = C \times \lambda \times M_{blockSize} \times \sum_{j=0}^{N}(K_j \times dist(p_{i,j}, v_{ME,j}))$$

The subjective distortion will be high if the prediction vector is far from the motion estimation vector.

Calculation of the cost obtained for this prediction vector using formula (4) above (J'=D+D'+λR).

The encoding unit 111 then compares the costs of all the tested prediction candidates, and selects that which corresponds to the lowest cost. This cost will be that of the Skip mode for the current block. The Skip prediction vector chosen with this method is that which gives the best visual result.

Inter Mode Test:

With reference to FIG. 1, the motion estimation 110 provides a set of motion vectors in the form $(v_{ME,0}, \ldots v_{ME,N})$ with N the number of possible reference images for this block. The Inter/Skip prediction unit 104 generates a list of possible vectors for the Inter mode, called Inter motion vectors, in the form $\{VM_0, VM_K\}$ where K is the number of vectors to be tested and where each vector is in the form $VM_i=v_{i,0}, \ldots v_{i,N})$ with N the number of possible reference images.

For each Inter motion candidate $MV_i$, the encoding unit 111 carries out the following operations:
Calculation of the coding rate R.
Calculation of the objective distortion D.
Calculation of the subjective distortion D' using formula (18) above and the set of vectors originating from the motion estimation.

$$D'_i = C \times \lambda \times M_{blockSize} \times \sum_{j=0}^{N}(K_j \times dist(MV_{i,j}, v_{ME,j}))$$

The subjective distortion will be high if the prediction vector is far from the motion estimation vector.

Calculation of the cost obtained for this prediction vector using formula (4) above (J'=D+D'+λR).

The encoding unit 111 then compares the costs of all the tested Inter motion vectors, and selects that which corresponds to the lowest cost. This cost will be that of the Inter mode for the current block.

Intra Mode Test:

It is assumed that several possible Intra directions exist for the current block.

For each possible direction, the encoding unit 111 carries out the following operations:
Calculation of the coding rate R.
Calculation of the objective distortion D.
Calculation of the subjective distortion D' which is equal to an empirical constant:

$$D'=Cst_{Intra} \qquad (19)$$

Calculation of the cost obtained for this Intra direction using formula (4) above (J'=D+D'+λR).

The encoding unit 111 then compares the costs of all the Intra directions, and selects the direction which corresponds to the lowest cost. This cost will be that of the Intra mode for the current block.

The costs of the Inter, Skip and Intra modes are then compared by the encoding unit 111 in order to decide the best mode. In the case where the best Skip prediction vector obtained is visually "incorrect", the cost of the Skip mode will be high, and the encoding unit will choose to code the block according to the Intra or Inter coding mode for better visual rendering if the cost of the Skip mode is greater than the cost of the Intra and Inter modes.

Depending on the embodiment chosen, certain acts, actions, events or functions of each of the methods described in the present document can be carried out or be produced in an order different from that in which they have been described, or can be added, merged or not be carried out or not be produced, as appropriate. Moreover, in certain embodiments, certain acts, actions or events are carried out or are produced concurrently and not successively.

Although described by means of a certain number of detailed embodiment examples, the proposed encoding method and the equipment for implementation of the method comprise different variants, modifications and improvements which will become clearly apparent to a person skilled in the art, it being understood that these different variants, modifications and improvements fall within the scope of the invention, as defined by the following claims. Furthermore, different aspects and characteristics described above can be implemented together or separately, or substituted for each other, and the set of different combinations and sub-combinations of the aspects and characteristics fall within the scope of the invention. Moreover, it is possible that certain systems and equipment described above do not incorporate all of the modules and functions described for the preferred embodiments.

The invention claimed is:

1. A method for encoding a first image in a set of images, wherein the first image is split into blocks, each block being encoded according to one among a plurality of coding modes comprising at least one coding mode of temporal correlation prediction type using a plurality of images from the set of images, the method comprising, for a current block of the first image:
   determining a first motion estimation vector of the current block, the first motion estimation vector pointing to a block correlated with the current block in a second image from the set of images, distinct from the first image and previously coded according to a predefined encoding sequence of the images from the set of images;
   determining a value of a visual distortion metric for a coding mode of temporal correlation prediction type, the visual distortion metric using a distance between a first temporal prediction vector of the current block for the coding mode pointing to the second image and the first motion estimation vector of the current block; and
   using the value of the visual distortion metric for selecting a coding mode to be used for encoding the current block.

2. The encoding method according to claim 1, further comprising:
   determining a plurality of N motion estimation vectors of the current block, N being an integer greater than or equal to two, each motion estimation vector pointing respectively to a block correlated with the current block in N respective images distinct from the first image and previously coded according to the encoding sequence, and in distinct pairs,
   wherein the visual distortion metric also uses respective distances between a temporal prediction vector of the current block pointing to one among the respective images and one among the plurality of N motion estimation vectors of the current block pointing to one among the respective images.

3. The method according to claim 2, wherein the visual distortion metric for the coding mode of temporal correlation prediction type using N images from the set of images, N being an integer greater than or equal to 1, is in the form $$\Sigma_{i=1}^{N} \text{dist}(v_{t,i}, v_{ME,i}), \text{ where}$$

$\text{dist}(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously coded according to the encoding sequence, and an $i^{th}$ temporal prediction vector, and among N temporal prediction vectors of the current block, pointing to the same image as the motion estimation vector $v_{ME,i}$.

4. The method according to claim 2, wherein the visual distortion metric for the coding mode of temporal correlation prediction type using N images from the set of images, N being an integer greater than or equal to 1, is in the form:

$$C \times \lambda \times M_{blockSize} \times \Sigma_{i=1}^{N}(K_i \times \text{dist}(v_{t,i}, v_{ME,i})), \text{ where}$$

C is a normalization constant,

λ is a Lagrange multiplier coefficient, $\text{dist}(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously coded according to the encoding sequence, and an $i^{th}$ temporal prediction vector, among N temporal prediction vectors of the current block, pointing to the same image as the motion estimation vector $v_{ME,i}$, $K_i$ is a degree of confidence of the $i^{th}$ motion estimation vectors $v_{ME,i}$, and $M_{blockSize}$ is a normalization constant determined as a function of the size of the current block.

5. The method according to claim 2, wherein the plurality of coding modes also comprises an Intra-type spatial correlation prediction coding mode.

6. The method according to claim 1, wherein the visual distortion metric for the coding mode of temporal correlation prediction type using N images from the set of images, N being an integer greater than or equal to 1, is in the form $$\Sigma_{i=1}^{N} \text{dist}(v_{t,i}, v_{ME,i}), \text{ where}$$

$\text{dist}(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously coded according to the encoding sequence, and an $i^{th}$ temporal prediction vector, and among N temporal prediction vectors of the current block, pointing to the same image as the motion estimation vector $v_{ME,i}$.

7. The method according to claim 6, wherein the visual distortion metric for the coding mode of temporal correlation prediction type using N images from the set of images, N being an integer greater than or equal to 1, is in the form:

$$C \times \lambda \times M_{blockSize} \times \Sigma_{i=1}^{N}(K_i \times \text{dist}(v_{t,i}, v_{ME,i})), \text{ where}$$

C is a normalization constant,
λ is a Lagrange multiplier coefficient,
$\text{dist}(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously coded according to the encoding sequence, and an $i^{th}$ temporal prediction vector, among N temporal prediction vectors of the current block, pointing to the same image as the motion estimation vector $v_{ME,i}$,
$K_i$ is a degree of confidence of the $i^{th}$ motion estimation vectors $v_{ME,i}$, and
$M_{blockSize}$ is a normalization constant determined as a function of the size of the current block.

8. The method according to claim 1, wherein the visual distortion metric for the coding mode of temporal correlation prediction type using N images from the set of images, N being an integer greater than or equal to 1, is in the form:

$$C \times \lambda \times M_{blockSize} \times \Sigma_{i=1}^{N}(K_i \times \text{dist}(v_{t,i}, v_{ME,i})), \text{ where}$$

C is a normalization constant,
λ is a Lagrange multiplier coefficient,
$\text{dist}(v_{t,i}, v_{ME,i})$ is a distance between an $i^{th}$ motion estimation vector, $v_{ME,i}$ among N motion estimation vectors pointing respectively to a block correlated with the current block in N distinct respective paired images, distinct from the first image and previously coded according to the encoding sequence, and an $i^{th}$ temporal prediction vector, among N temporal prediction vectors of the current block, pointing to the same image as the motion estimation vector $v_{ME,i}$,
$K_i$ is a degree of confidence of the $i^{th}$ motion estimation vectors $v_{ME,i}$, and
$M_{blockSize}$ is a normalization constant determined as a function of the size of the current block.

9. The method according to claim 1, wherein the plurality of coding modes also comprises an Intra-type spatial correlation prediction coding mode.

10. The method according to claim 1, wherein the coding mode of temporal correlation prediction type using a plurality of images from the set of images is of a type using a motion prediction based on previously coded images or of a type using a predetermined prediction vector selected from previously coded blocks adjacent to the current block.

11. The method according to claim 1, wherein the visual distortion metric includes a confidence factor for the motion estimation.

12. The method according to claim 11, wherein confidence factor is determined relative to the inverse of a measurement of correlation between the current block and its movement according to a motion estimation vector.

13. The method according to claim 1, further comprising:
determining a plurality of values of a decision criterion for respectively different test coding modes of the current block, the decision criterion comprising the visual distortion metric; and
selecting a coding mode corresponding to a minimum of the respective values of the decision criterion for the different test coding modes of the current block.

14. The method according to claim 13, wherein the decision criterion is in the form:

$$J' = D + \lambda R + D', \text{ where}$$

D is a distortion metric introduced by the encoding measuring the correlation between the current block and the predicted block,
λ is a Lagrange multiplier coefficient,
R represents a coding rate, and
D' is a visual distortion metric.

15. The method according to claim 14, wherein the visual distortion metric D', for a test coding mode of temporal correlation prediction type using two images from the set of images, in the form:

$$D' = C \times \lambda \times M_{blockSize} \times (K_{L0} \times \text{dist}(vL0_t, vL0_{ME})), \text{ where}$$

C is a normalization constant,
λ is the Lagrange multiplier coefficient,
$\text{dist}(vL0_t, vL0_{ME})$ is a distance between the first temporal prediction vector, $vL0_t$, and
the first motion estimation vector, $vL0_{ME}$, $K_{L0}$ is a degree of confidence of the first motion estimation vector $vL0_{ME}$, and $M_{blockSize}$ is a normalization constant determined as a function of the size of the current block.

16. The method according to claim 14, wherein the visual distortion metric visual distortion metric D', for a test coding mode of spatial correlation prediction type, is a predetermined constant.

17. A device for encoding images comprising:
an input interface configured for receiving a first image from a set of images;
a unit for encoding images, operatively coupled to the input interface, and configured for:
splitting the first image into blocks, and
encoding each block according to one among a plurality of coding modes comprising at least one coding mode of temporal correlation prediction type using a plurality of images from the set of images according to the method of claim 1.

18. A non-transitory computer storage medium storing a computer-executable program, comprising a data set representing one or more programs, said one or more programs comprising instructions for causing a computer to encode a first image split into blocks according to the method according to claim 1, during the execution of said one or more programs by said computer.

* * * * *